United States Patent [19]
Hagen

[11] Patent Number: 5,201,458
[45] Date of Patent: Apr. 13, 1993

[54] METHOD OF WELDING A HEAD SUSPENSION ASSEMBLY

[75] Inventor: Tracy M. Hagen, Edina, Minn.

[73] Assignee: Seagate Technology, Inc., Scotts Valley, Calif.

[21] Appl. No.: 606,573

[22] Filed: Oct. 31, 1990

[51] Int. Cl.⁵ .............................................. G11B 5/49
[52] U.S. Cl. ............................. 228/199; 219/121.64; 360/104
[58] Field of Search .............. 228/199, 232, 125, 19, 228/155; 219/121.63, 121.64, 121.7, 121.6, 121.61; 360/104

[56] References Cited

U.S. PATENT DOCUMENTS

| | | | |
|---|---|---|---|
| 3,187,112 | 6/1965 | Smith, Jr. . | |
| 3,410,979 | 11/1968 | Larsson | 219/121.7 |
| 3,474,219 | 10/1969 | Steigerwald et al. | 219/121.64 |
| 3,931,641 | 1/1976 | Watrous . | |
| 4,167,765 | 9/1979 | Watrous . | |
| 4,211,354 | 6/1980 | Hoffman et al. . | |
| 4,330,804 | 5/1982 | DeMoss . | |
| 4,341,942 | 7/1982 | Chaudhari et al. | 219/121.63 |
| 4,603,089 | 7/1986 | Bampton | 219/121.61 |
| 4,607,150 | 8/1986 | Bannister | 219/121.63 |
| 4,697,061 | 9/1987 | Spater et al. | 219/121.64 |
| 4,700,250 | 10/1987 | Kuriyama . | |
| 4,724,500 | 2/1988 | Dalziel | 360/104 |
| 4,755,652 | 7/1988 | LaRocca | 219/121.63 |
| 4,786,999 | 11/1988 | Tanaka et al. | 360/104 |
| 4,797,763 | 1/1989 | Levy et al. . | |
| 4,866,836 | 9/1989 | Von Brandt et al. . | |
| 4,948,939 | 8/1990 | Moon | 219/121.63 |

FOREIGN PATENT DOCUMENTS 60-154872  8/1985  Japan .................................. 228/194

OTHER PUBLICATIONS

*Welding and Welding Technology*, McGraw-Hill Book Co., "Weld Symbols", p. 161, 1974.
*Welding Handbook 5th ed.*, American Welding Society, "Welding, Cutting and Related Processes", pp. 56.2-56.14, 1964.
*Welding Engineering*, McGraw-Hill Book Co., "Residual Stresses in Welding Structures", p. 601, 1954.
*Nd: YAG Advances Aid Production*, Photonics Spectra, Nov. 1989 by T. Kugler et al. pp. 143-148.

Primary Examiner—Richard K. Seidel
Assistant Examiner—Jeanne M. Elpel
Attorney, Agent, or Firm—Kinney & Lange

[57] ABSTRACT

In a disc drive head suspension assembly, welding induced stresses and deformation resulting from welding a gimbal to a load beam are reduced. Apertures, preheating or compression are used to relieve residual stresses.

23 Claims, 11 Drawing Sheets

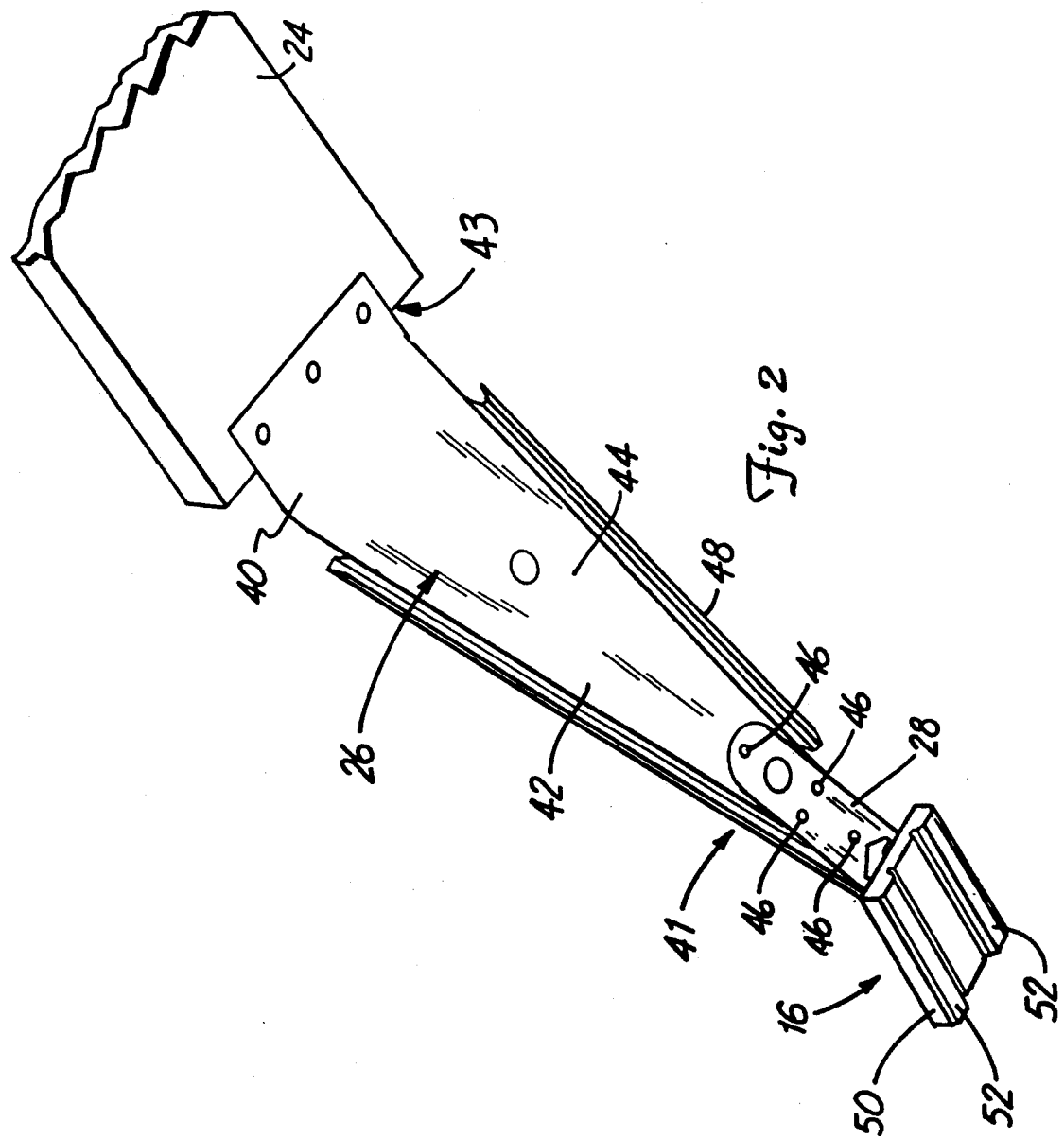

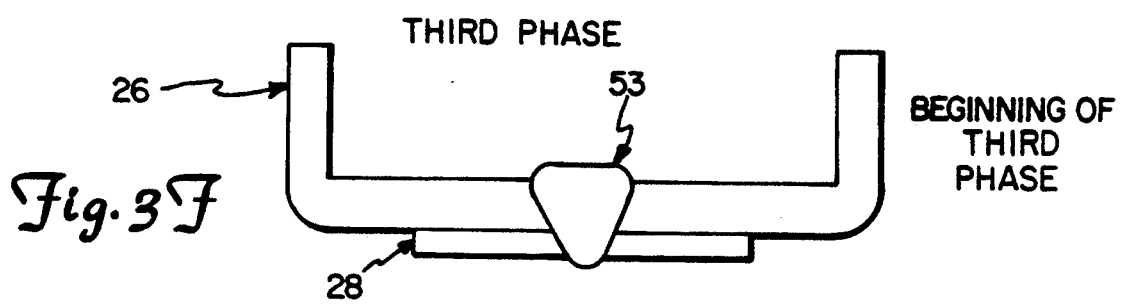
Fig. 3F — THIRD PHASE — BEGINNING OF THIRD PHASE
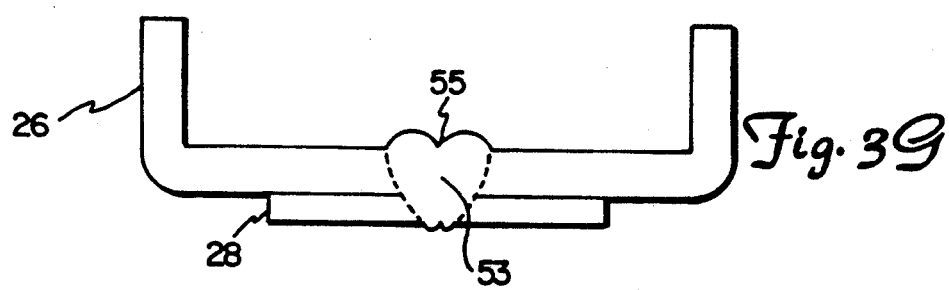
Fig. 3G
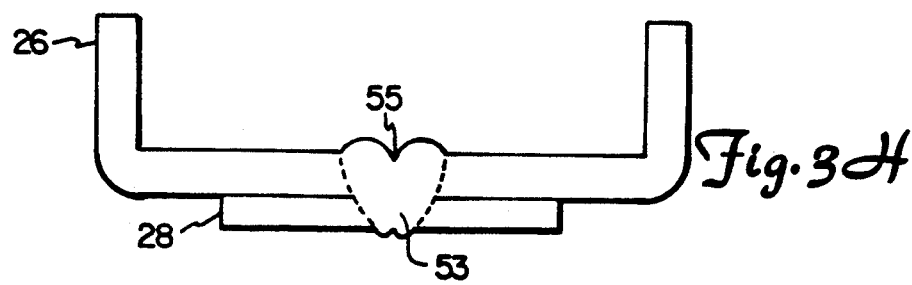
Fig. 3H
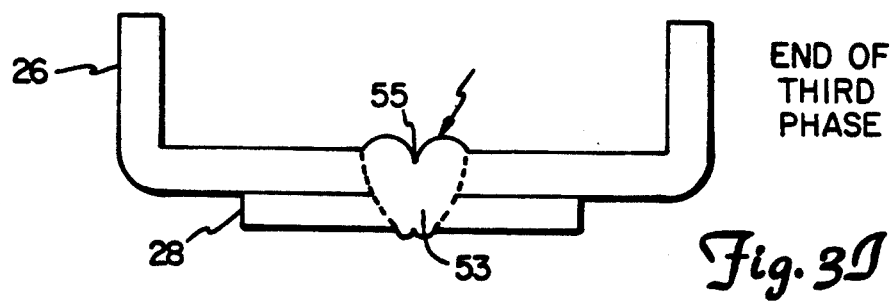
Fig. 3I — END OF THIRD PHASE
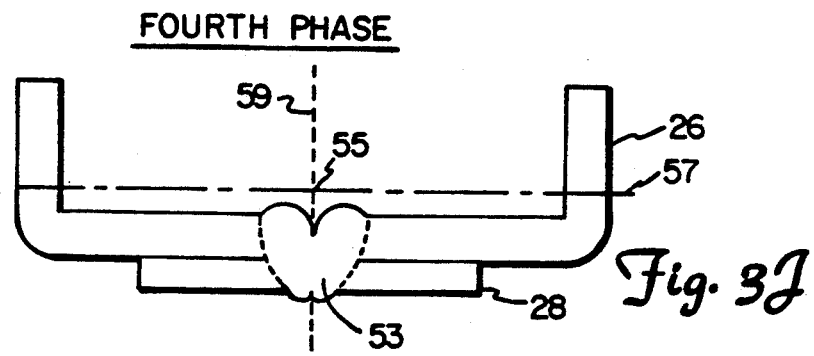
Fig. 3J — FOURTH PHASE

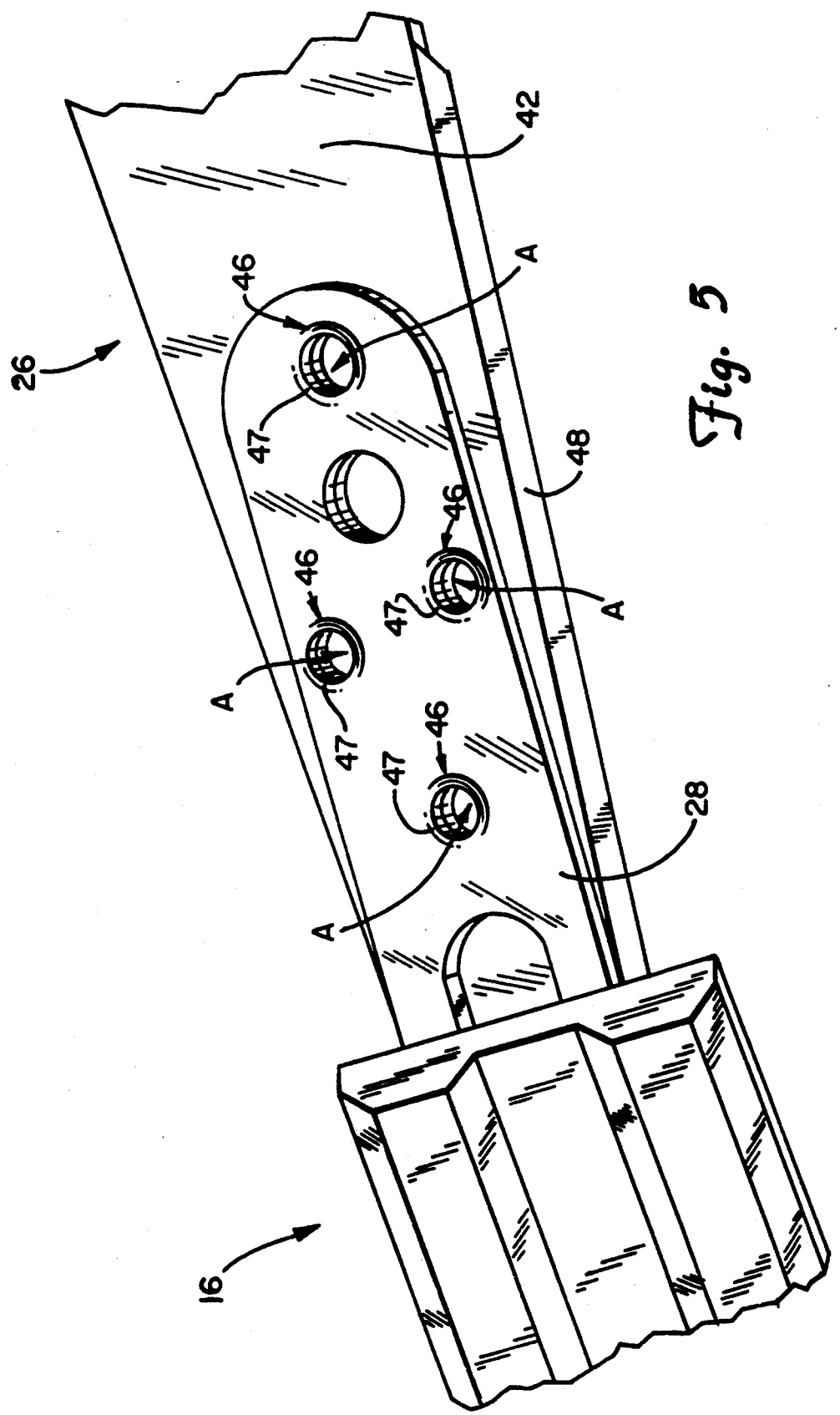

BEGINNING OF COMPRESSION

END OF COMPRESSION

METHOD OF WELDING A HEAD SUSPENSION ASSEMBLY

BACKGROUND OF THE INVENTION

The present invention relates to a head suspension assembly in an information storage system, such as a magnetic disc drive. In particular, the present invention relates to a method of reducing deformation of a load beam and a gimbal induced by a welding process used to join them together.

In a magnetic disc drive, information is stored in the form of magnetically polarized bit positions on the surface of a rapidly rotating magnetic disc. Information is written to the disc and read from the disc by a transducer which is mounted on an air bearing slider. Information bit positions are arranged in generally concentric data tracks on the disc. The data tracks are further subdivided into sectors for ease of information organization.

The transducer and air bearing slider are collectively referred to as the head. The head flies in close proximity (5 to 10 micro inches) to the disc's surface, precisely balanced between hydrodynamic forces developed by the slider and an applied preload spring force.

As the disc rotates, hydrodynamic drag causes a thin layer of air molecules to remain essentially stationary relative to the disc's surface. This air layer is pulled under ski surfaces of the slider and induces high air pressure under them. The high air pressure under the slider generates a lifting force which keeps the head suspended over the magnetic disc.

The head should be supported in a manner which allows it to pitch, roll and move perpendicularly to the disc surface in order to follow small irregularities of the disc surface. In contrast, the head should be rigidly fixed in the plane of the disc surface in order to avoid off-track read errors.

A head support and suspension assembly precisely positions the head over the magnetic disc. The suspension assembly provides a precisely controlled preload spring force to the head, as well as freedom of motion about pitch and roll axes and normal to the plane of the disc's surface. Motion about the head's yaw axis, as well as in the in-plane directions is reduced, to the extent possible, by making the support assembly rigid in those directions.

The support and suspension assembly which moves and positions the head consists of three components. The first component is a rigid support arm which pivots on a servo spindle, firmly supporting the rest of the assembly as well as precisely controlling movement of the head in a radial direction over the surface of the disc.

The second component of the head support and suspension assembly is a load beam which is attached to the rigid support arm. The proximal end of the load beam, attached to the rigid support arm, is resilient in a direction normal to the disc surface. This resiliency is combined with a preformed bend to provide a preload spring force. In this way, the load beam pushes the head towards the disc surface while still permitting it to move and follow the topography of the disc.

The load beam has a rigid portion, the rigidity being achieved by stiffening channels or other bracing methods. The rigid portion transmits the preload spring force to the distal end of the load beam where the gimbal and head are attached. Additionally, the rigid portion of the load beam provides stable positioning of the head in all directions in the plane of the disc surface.

The third component of the head support and suspension assembly is a gimbal which connects the distal end of the load beam to the head. The gimbal is resilient in the head's pitch and roll directions to allow the slider to follow the topography of the disc which it is flying over. Also, the gimbal is rigid in the yaw and in-plane directions to maintain precise in-plane head positioning. The head and gimbal together are often referred to as the head-gimbal assembly.

There has been a continual drive to increase information storage density of disc drives. Minimum head to disc separation has become a critically limiting factor in the maximum storage density attainable. Head to disc separation is governed, to a large extent, by the characteristics of the head and support suspension assembly and the variation of said characteristics. Unwanted variation of the head and suspension assembly can induce undesirable forces and moments on the air bearing surfaces of the sliders. The direction and magnitude of the applied moments are a function of the suspension's static attitude.

The static attitude is the position the head takes in relation to the fastening points of the resilient end of the load beam when no forces are applied to the head. The static attitude, together with the spring constant of the gimbal, control the magnitude and direction of the applied moments on the head. This, in turn, has a major affect on the head-to-disc spacing and the characteristics of the head support and suspension assembly.

Two critical components of the static attitude are the pitch and roll static angles. These angles can be defined as the angles between the plane of the disc surface and the plane of the slider ski surface that would occur if the disc were not present (i.e. if no normal force were applied to the head by the disc). The pitch static angle is a primary determinate of the angle of the surface of the slider relative to the disc surface and thus is critical to the flying height of the head. The roll static angle controls the levelness of the head's flight and the relative heights of the two slider skies and thus can also affect the transducer's height. In addition, applied pitch and roll moments can cause extended dragging time of the slider along the disc during start-up of the disc drive.

Ideally, the suspension assembly should load the head against the disc such that no pitch or roll moments are applied to the head. Moments are usually created by either a damaged gimbal or the natural variation of the components due to manufacturing processes. When the head is loaded to the disc, the gimbal deflects to allow the removal of the pitch static angle and the roll static angle. The gimbal's resistance to this deflection is the direct cause of pitch and roll moments on the slider. These moments have been found to account for as much as 90% of the variation in slider fly height, pitch attitude, and roll attitude; which in turn affects the electrical output of the transducer and the reliability of the data storage process.

SUMMARY OF THE INVENTION

Manufacturing the components of the head suspension assembly to increasingly tight tolerances has become problematic, especially considering their small size and weight. One major concern of the manufacturing process is variation in the static attitude of the suspension. It has been found that static attitude can be affected by residual stresses remaining in the gimbal and load beam after laser welding the two together.

The residual stresses can be attributed to certain portions of prior art welding methods Prior art welding entails placing the surfaces of the gimbal and load beam in contact and then projecting a laser beam pulse onto the outside surface of one of the components. The laser beam pulse is of sufficient intensity and duration to heat through the metal and melt both inside contacting surfaces. The laser beam is then shut off and the metal cools, forming a spot weld.

It has been found that contraction of the weld during cooling causes large residual stresses to develop in the weld spot and surrounding material. These residual stresses have associated strains that cause the free end of the load beam to deflect or bend, changing the static attitude.

It has also been found that, if the weld spots are not located exactly on the longitudinal center line of the load beam, then the residual strains cause the load beam to twist as well as bend. Thus, variations in the placement of the weld spots cause variations in the static attitude of the suspension.

This invention provides a method of attaching the gimbal to the load beam for a head suspension assembly such that residual stresses in the welds are substantially less than methods currently employed. By reducing the residual stresses associated with the attachment, this method of welding significantly reduces the sensitivity of the static attitude of the suspension assembly to the welding process.

In a first preferred embodiment of the present invention, small holes are located in each weld spot such that each gimbal-to-load beam weld is left with a small through hole near the center of the weld. This hole allows the weld spot to cool and contract with a minimum of residual stress remaining in the load beam and gimbal material.

In a second preferred embodiment of the present invention, the material of the load beam and gimbal are preheated to a temperature substantially above room temperature but still below the melting point, prior to welding. This preheating acts to reduce the amount of residual stress left after the weld cools.

In a third preferred embodiment of the present invention, residual stresses are relieved after the welding process by means of compression forming the weld. In this embodiment, a forming tool is provided that compresses the weld such that substantially all of the residual tensile stress of the weld is removed, thereby reducing variations in the static attitude of the suspension assembly.

BRIEF DESCRIPTION OF THE DRAWINGS

FIG. 2 is a perspective view of a load beam connected to a head-gimbal assembly in accordance with the present invention.

FIGS. 3A-3J show time variant welding phases as they affect load beam to gimbal welds.

FIG. 5 shows the distal end of the load beam with a head-gimbal assembly attached by welding in accordance with one preferred embodiment of the present invention.

DETAILED DESCRIPTION OF THE PREFERRED EMBODIMENTS

Figure 1:
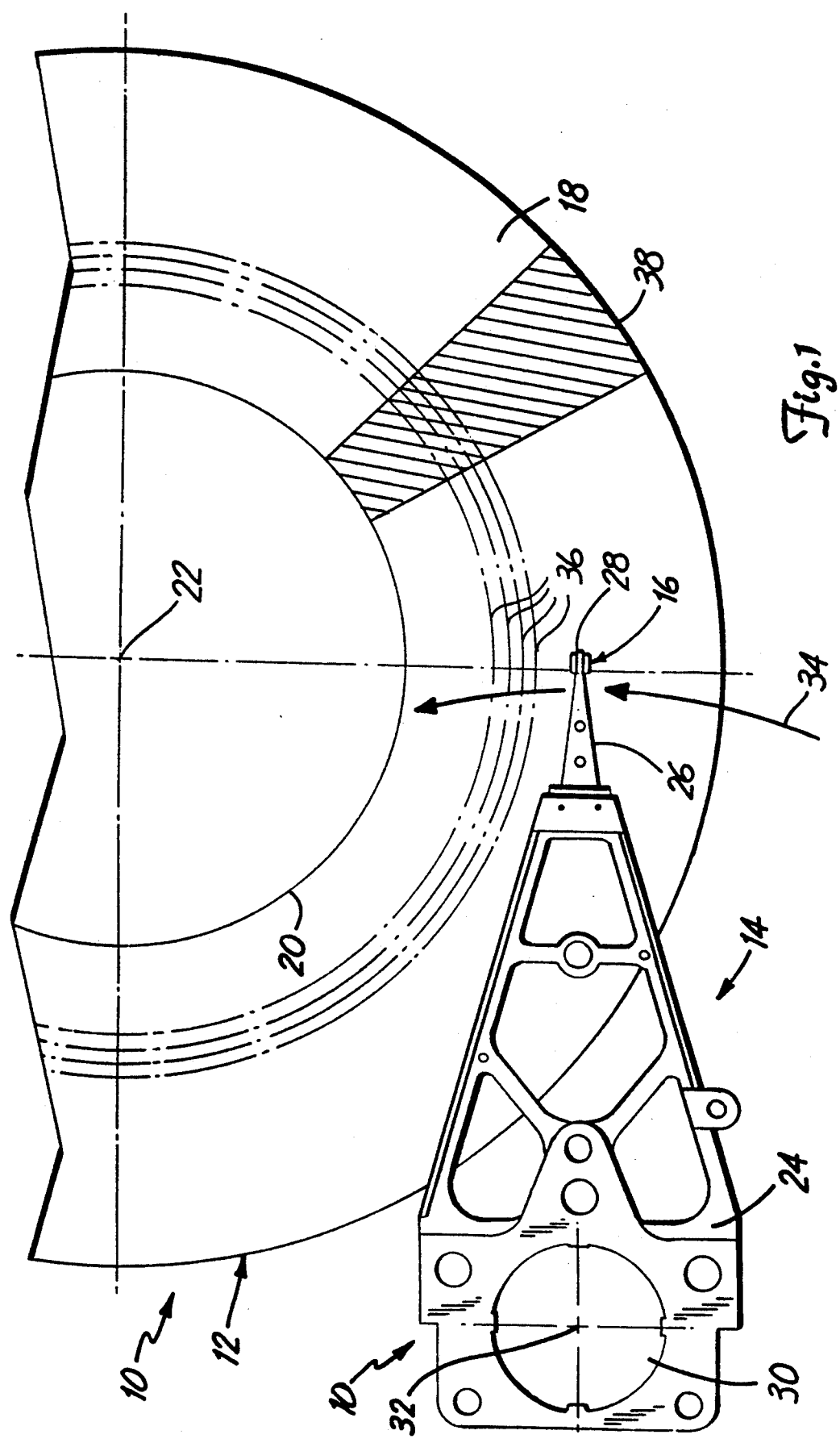
FIG. 1 is a top plan view of a disc drive in accordance with the present invention.
Figure 3A:
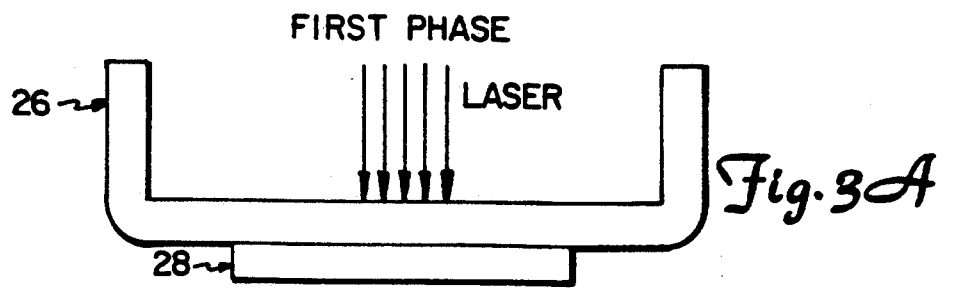
Figure 3B:
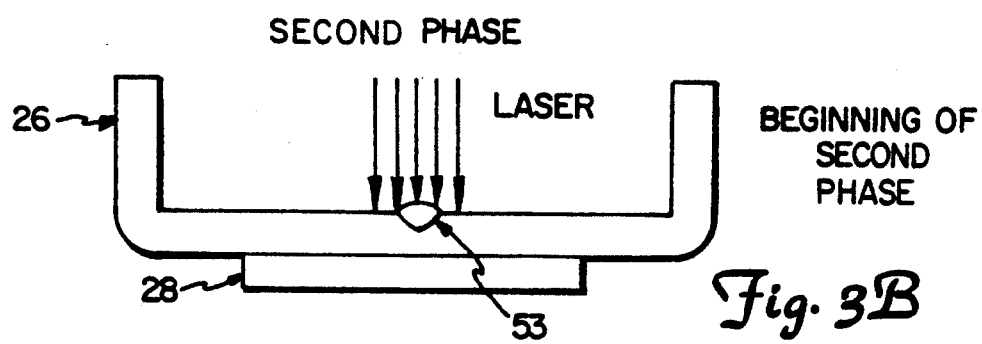
Figure 3C:
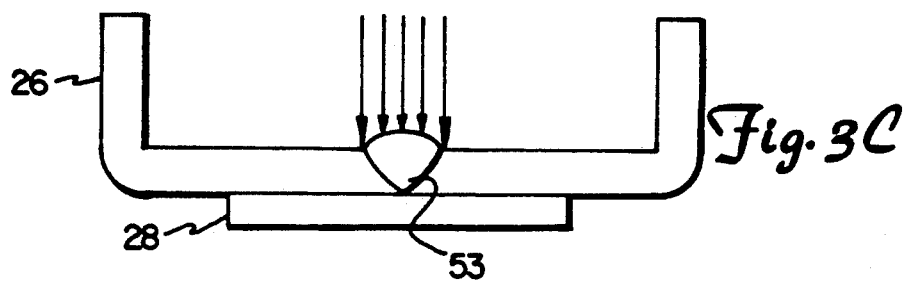
Figure 3D:
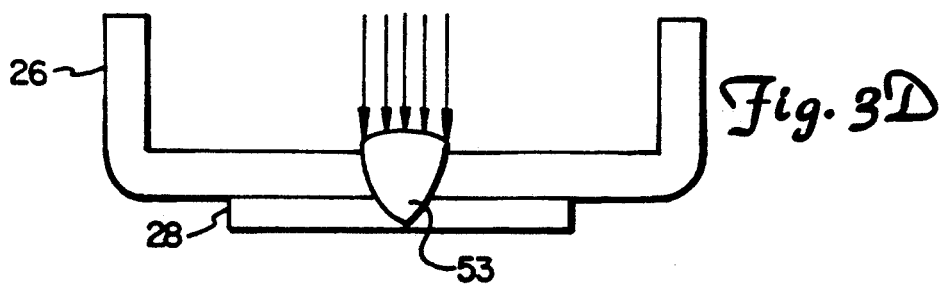
Figure 3E:
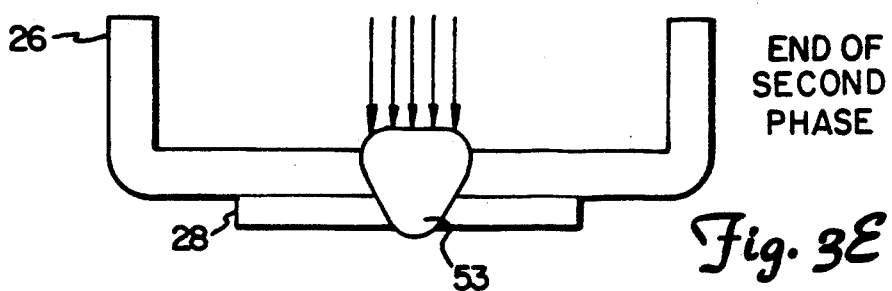
Figure 4A:
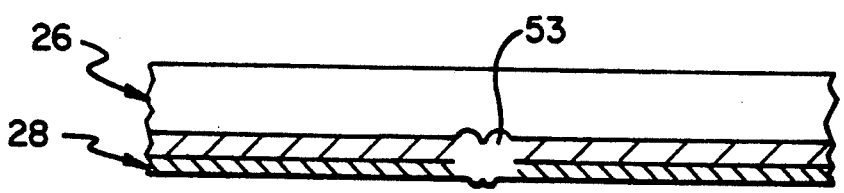
FIGS. 4A-4D show a longitudinal cross section of a weld spot.
Figure 4B:
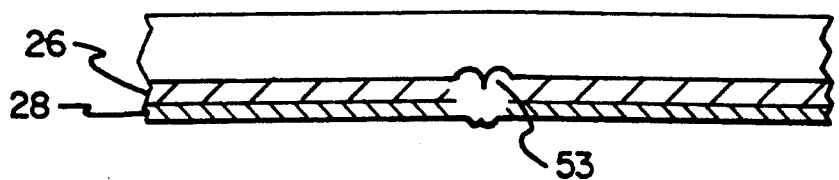
Figure 4C:
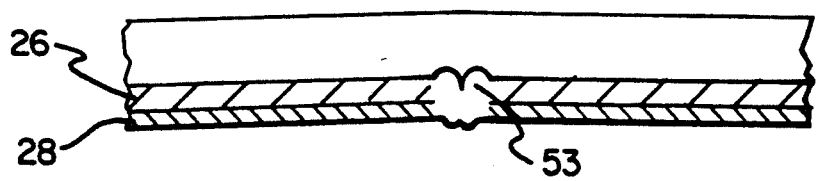
Figure 4D:
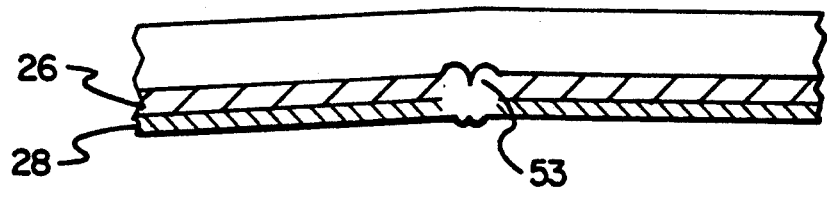

FIG. 1 shows a portion of a disc drive 10 for storing magnetically encoded information on a selectively magnetizable disc. Disc drive 10 includes magnetic disc assembly 12, head suspension assembly 14, and head-gimbal assembly 16. Magnetic disc assembly 12 includes magnetic disc 18 which is connected to spindle 20 for rotation about rotation axis 22.

Head suspension assembly 14 includes actuator arm 24 and load beam 26. Actuator arm 24 is connected between servo spindle 30 and load beam 26. Load beam 26, in turn is connected to head-gimbal assembly 16. As servo spindle 30 pivots about pivot axis 32, head-gimbal assembly 16 swings through arc 34. As magnetic disc 18 rotates beneath head-gimbal assembly 16, this pivoting motion causes head-gimbal assembly 16 to change radial track positions 36 over magnetic disc 18 to access various information sectors 38 on disc 18.

FIG. 2 shows a more detailed view of head-gimbal assembly 16 connected to load beam 26 in accordance with the present invention. Head-gimbal assembly 16 includes gimbal 28, slider 50 and a magnetic transducer (not shown) for reading from and writing to disc 18.

Load beam 26 has a distal end 41 and a proximal end 43 and includes bent resilient section 40 and rigid section 42. Rigid section 42 includes central planar area 44 and stiffening flanges 48. The proximal end 43 is connected to actuator arm 24. The distal end 41 is connected to gimbal 28. Gimbal 28 is, in turn, connected to slider 50.

Slider 50 has ski surfaces 52 which face magnetic disc 18 (shown in FIG. 1). When magnetic disc 18 rotates, a lifting force is generated and applied to ski surfaces 52 by hydrodynamic effects. The lifting force raises head-gimbal assembly 16 approximately 5 to 10 micro inches above magnetic disc 18.

When head suspension assembly 14 is assembled into disc drive 10, resilient section 40 of load beam 26 is deflected. Deflection of resilient section 40 results in stress in the material of resilient section 40. Since the proximal end 43 of load beam 26 is firmly connected to actuator arm 24, the stress in resilient section 40 results in a moment applied to rigid section 42 of load beam 26. The moment is transmitted through stiffener flanges 48 to head-gimbal assembly 16 where it is counteracted by the hydrodynamic lifting force generated under ski surfaces 52 of slider 50.

Those familiar with the art recognize that the gimbal 28 is sometimes secured to the load beam 26 by four welds created by brief pulses of a laser beam. The laser locally heats the load beam 26 and the gimbal 28 until the two coalesce to form a weld.

The welding process can be considered in four time varying phases as illustrated in FIGS. 3A-3J. In the first phase, illustrated in FIG. 3A, the laser beam strikes the metal materials used to form load beam 26 and gimbal 28 shown in cross section. Heat is transmitted to the metal via radiation at the wavelength of the laser beam. With time, the temperature in the metal rises. Also with time, heat goes through the metal via conduction. As the metal heats, it also tries to expand due to its positive coefficient of linear expansion. This expansion is resisted by cooler material surrounding the laser beam contact point. Thus, during the initial heating phase, the material heated by the laser beam is compressively strained as it tries to expand against the cooler surrounding material.

In the second phase, illustrated in FIGS. 3B-3E, the material heated by the laser beam achieves a temperature high enough to melt. Once the material becomes molten in an area 53, it softens substantially. This allows the cooler surrounding material to release its compressive strains and relax back. As the cooler material relaxes back, it expands into the molten weld area 53 forcing the molten material to bulge out in a direction parallel to the laser beam. This melting and bulging takes place until some material from both the load beam 26 and the gimbal 28 is melted and laser power is turned off.

In the third phase, shown in FIGS. 3F-3H, the laser is turned off and the weld begins to cool. Heat flows radially outward from the weld into the cooler surrounding material and solidification of the molten metal furthest from the center of the weld 53 begins As this material solidifies, and further cools it contracts as well, pulling molten material from the center of the weld 53. This creates a depression 55 of as much as 0.0006 inches in the center of the weld 53. This process continues until the weld 53 solidifies completely.

In the fourth phase, shown in FIG. 3J, cooling continues and as the weld 53 cools, it attempts to contract, again due to the positive coefficient of linear expansion. This contraction is resisted by the surrounding material and, as a result, the surrounding material and the weld 53 are tensionally strained The strains can result in stresses exceeding the tensile strength of the material, creating numerous microfractures.

In general, gimbal to load beam welds are not, by design, located on the neutral bending axis 57 of a cross section taken perpendicular to the longitudinal center line 59 of the suspension at the location of each weld 53. Rather, welds are typically located at other points roughly along the longitudinal center line. The residual strains left in each weld 53 can therefore significantly bend the end of the load beam if the welds are not located on the neutral bending axis.

This bending, which occurs during the fourth phase of the welding process, in shown in FIGS. 4A-4D which show load beam 26 and gimbal 28 in cross section taken at an angle perpendicular to the cross section shown in FIGS. 3A-3J. As weld 53 cools and the surrounding material attempts to contract, the resulting stresses cause bending at the weld spot 53.

Furthermore, gimbal to load beam welds are not, due to natural manufacturing variations, located exactly about the longitudinal center line 59 of the suspension. If the weld is not located on the longitudinal center line 59 it strains the end of the load beam asymmetrically causing it to twist as well as bend.

It has been found that small welds reduce this problem, but weld size can only be reduced to a certain point since weld strength is vital to reliability of the suspension. Also, metals with a very low coefficient of linear expansion are very desirable. Unfortunately none exist that also meet the strength and resistance to corrosion requirements needed in a head suspension assembly. The preferred material for a head suspension assembly is a 300 series stainless steel due to its high strength capacity, and high resistance to corrosion and magnetism. However, this material is also considered to be a very poor conductor of heat, relative to other metals. This aggravates the problem of residual stresses left after the welding process because it causes a large thermal gradient between the weld and the surrounding material. This thermal gradient, in turn, results in large residual stresses remaining after the welding process is completed.

FIG. 5 is an enlarged view of distal end 41 of load beam 26 to which gimbal 28 has been welded in accordance with a first preferred embodiment of the present invention. Prior to welding gimbal 28 to load beam 26, apertures A are formed in both load beam 26 and gimbal 28 at load beam-to-gimbal weld spots 46. Load beam 26 and gimbal 28 are then welded together by heating the metal of either the load beam 26 or the gimbal 28 in an area 47 generally around the periphery of the aligned apertures A. Care should be taken to ensure that the apertures A remain after welding to reduce residual stresses. With the through holes in substantially the center of the weld spot 46, the residual stresses resulting from cooling and contraction of the material surrounding a normal weld are eliminated. Rather than being constrained by surrounding cooler material, as the weld cools and contracts, the apertures A provide an area of stress relief. Thus, the welding induced stress at the weld spots is substantially decreased.

Figure 6:
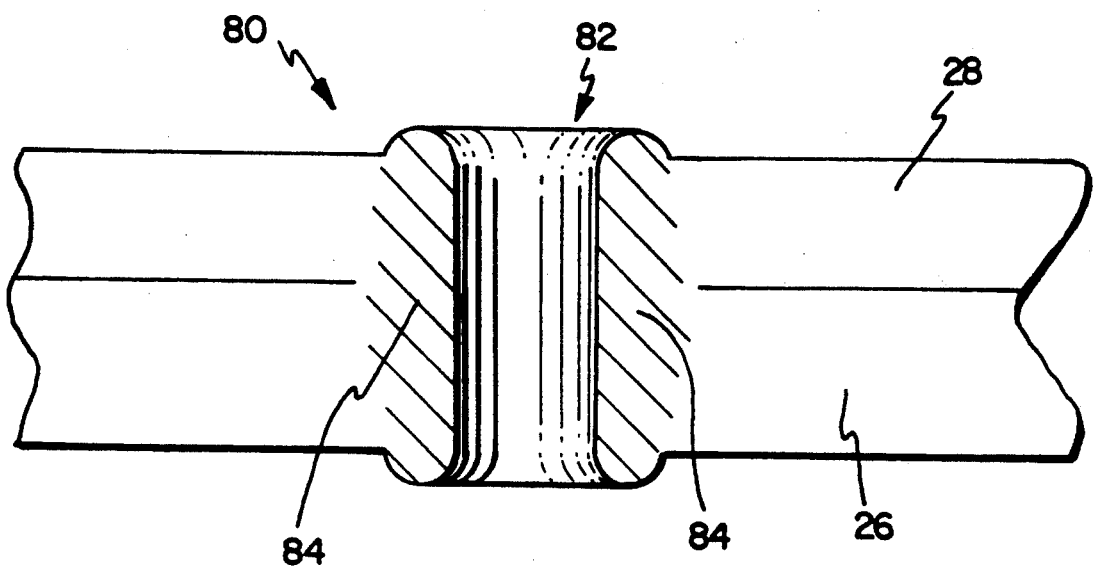
FIG. 6 is a cross sectional view of a gimbal to load beam weld with an aperture in accordance with the present invention.
Figure 9D:
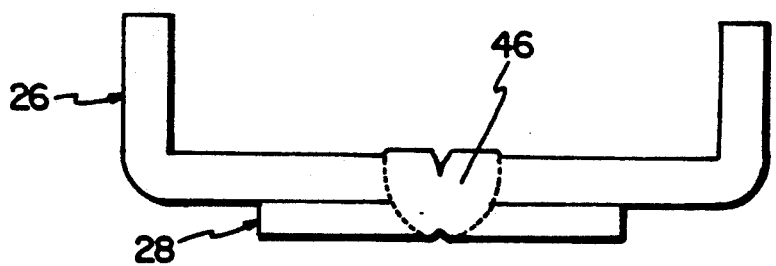
FIGS. 9A-9D show compression forming of a weld spot to relieve residual stresses.

FIG. 6 shows a cross section of a gimbal to load beam weld 80 with an aperture 82 in accordance with the present invention. The material of load beam 26 and gimbal 28 have been fused in region 84 by laser beam heating.

The apertures or holes in the metal in the load beam 26 and the gimbal 28 can either be chemically etched or "drilled" through with a high power laser. The diameter of the holes should be approximately equal to the sum of the thicknesses of the load beam 26 and the gimbal 28, both for ease of etching and to prevent the holes from closing up during welding. Thus, the diameter of the holes must be optimized for given thicknesses of load beam 26 and gimbal 28 as well as for a given laser wavelength and power density.

Unequal diameter holes in the load beam 26 and gimbal 28 may be advantageous during welding. For example, if the component nearest the laser (either the load beam 26 or gimbal 28) is provided with a hole larger in diameter than the component on the far side of the laser, the far side component can be heated during welding by both the laser and heat conduction from the upper component. This allows efficient heating.

The through holes etched into load beam 26 and gimbal 28 may be conical frustrums if different diameter holes are present on photoresist artwork applied to each side of pre-etched metal sheet stock used to manufacture load beam 26 and gimbal 28. Also, the through holes etched into the components need not be circular but can be elliptical, square, triangular, star, slotted, or any other convenient shape.

The welding of the load beam 26 to the gimbal 28 can be done either by using a laser with a beam substantially larger in diameter than the diameter of the through holes, or by using a laser beam with a small diameter and orbiting it around the outer diameter of the through holes to produce a seam weld.

Figure 7:
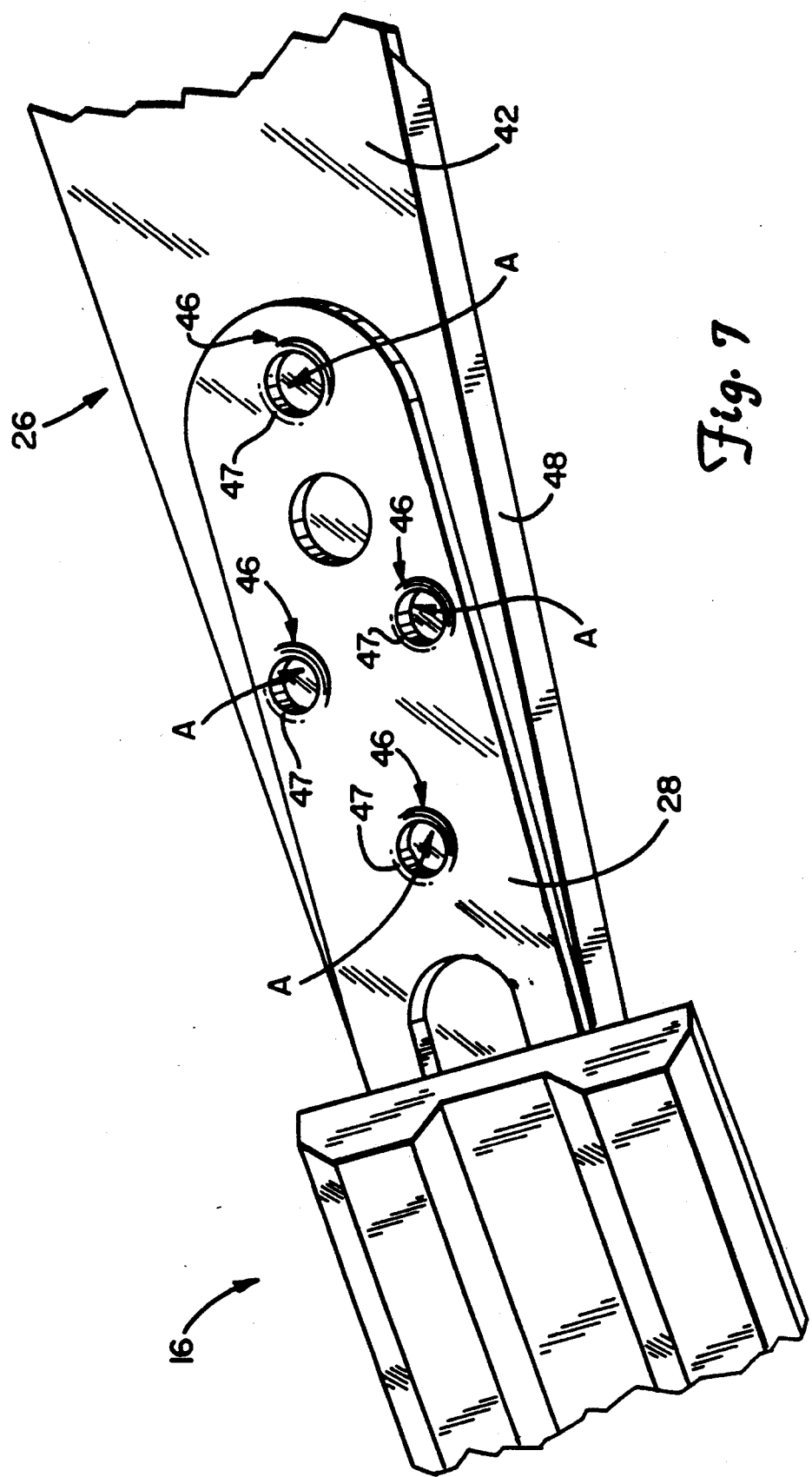
FIG. 7 shows the distal end of a load beam with a head-gimbal assembly attached by welding in accordance with another preferred embodiment of the present invention.

FIG. 7 shows the distal end 41 of load beam 26 to which gimbal 28 is welded in accordance with a slightly different embodiment of the present invention. Apertures are etched in gimbal 28 at weld spots 46 prior to welding. A laser beam (not shown) is then impinged upon gimbal 28 and load beam 26 at the weld spots 46 to melt the gimbal and load beam material proximate weld spots 46. Care is taken to ensure that the apertures in gimbal 28 remain open after welding to reduce residual stresses. Although the through holes do not extend through both the gimbal 28 and load beam 26, the residual stresses associated with the weld are still substantially reduced.

Figure 8:
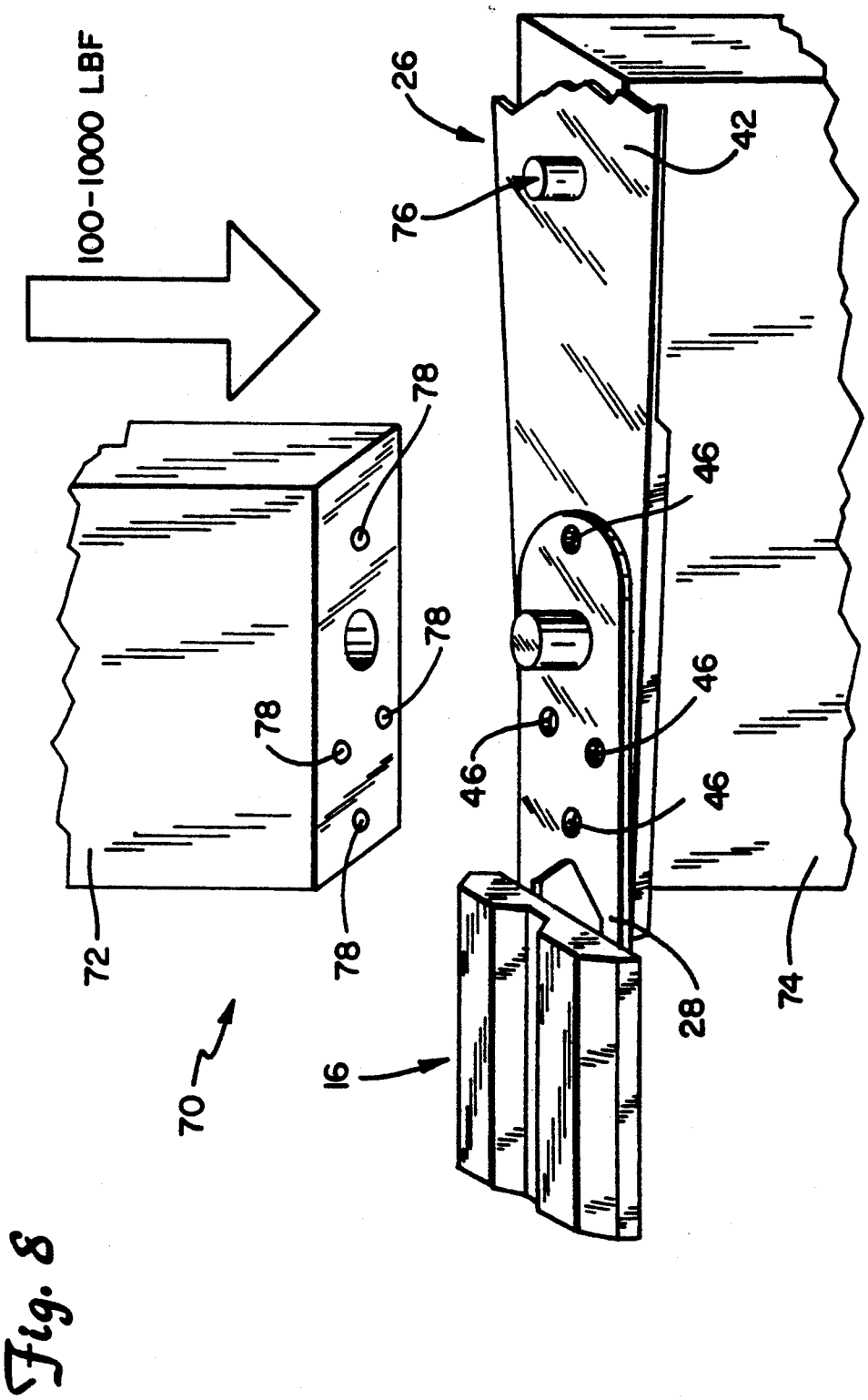
FIG. 8 shows a compression forming tool with a load beam and head-gimbal assembly in place for relieving welding induced residual stresses in accordance with the present invention.
Figure 9A:
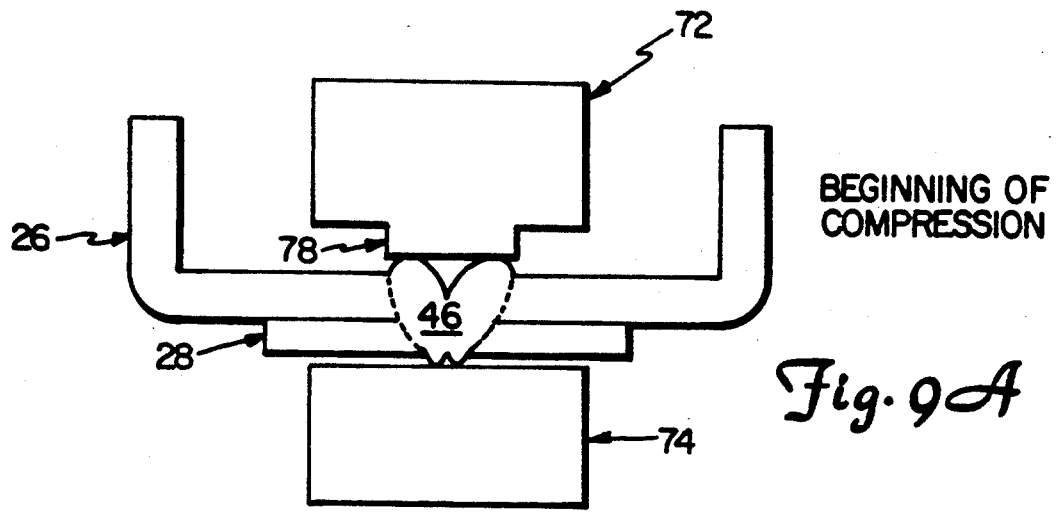
Figure 9B:
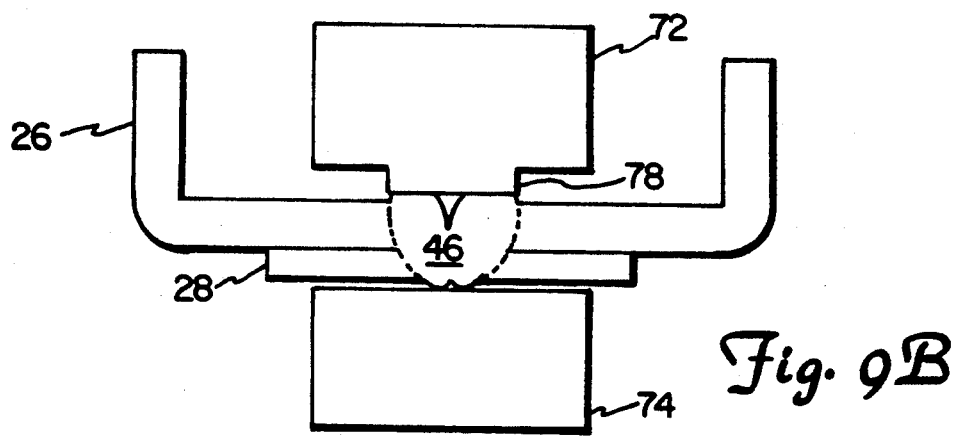
Figure 9C:
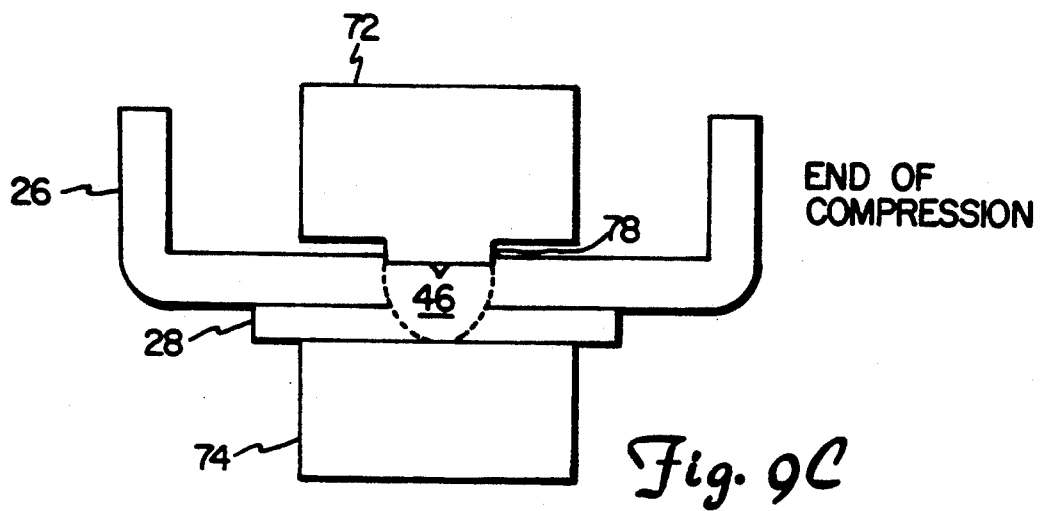

FIG. 8 shows a compression forming tool 70 for relieving residual stresses induced by welding in accordance with a third preferred embodiment of the present invention. The forming tool includes a hammer 72, an anvil 74, and locating pins 76. The hammer has mesas 78 for bearing against the weld spots 46 in the load beam 26 and gimbal 28.

The distal end 41 of the load beam 26, to which gimbal 28 has been welded, is shown precisely positioned on anvil 74 by locating pins 76. By applying compressive force against the weld spots 46, residual tensile stress in the weld is relieved thereby reducing variation in static attitude of the suspension assembly.

Operation is illustrated in FIGS. 9A-9D in which load beam 26, gimbal 28, hammer 72 and anvil 74 are shown in cross section. The hammer 72 is lowered on gimbal 28 and positioned so that mesas 78 bear against weld spots 46. The force applied by mesas 78 projecting from hammer 72 is sufficient to relieve residual stresses in the gimbal 28 and load beam 26 proximate weld spots 46.

Compression forming of the weld spots 46 can be accomplished by placing the suspension assembly 14 in the forming tool after load beam 26 is welded to gimbal 28. The suspension assembly 14 is oriented in the forming tool such that the surface of the portion of load beam 26 or gimbal 28 that was exposed to the welding laser is also exposed to the hammer 72. The hammer 72 is loaded against the suspension assembly 74 relatively slowly so as to prevent unwanted shock. Once in contact with the suspension assembly 14, the hammer 72 is urged into the suspension's weld spots 46 with a force of approximately 100 to 1000 pounds. During production runs, the amount of force applied to the hammer 72 in the compression forming tool should be continually adjusted by inferring residual stresses from load beam static angle measurements and adjusting the force accordingly.

As force is applied by the hammer 72, a cylindrical body of suspension material formed of solidified load beam and gimbal material at the location of each gimbal to load beam weld 46 is compressed between the hammer 72 and the anvil 74. Since this suspension material has a non-zero Poisson's ratio, it deforms radially outward, urging material into the region surrounding the weld 46. As material is urged toward the surrounding region, the tensile stresses that were induced during the cooling of the weld are rapidly diminished.

Enough force should be used so that after the hammer 72 is lifted and the suspension assembly 14 is removed from the tool, no residual stress is present in the material surrounding each weld. One indication of the lack of residual stress is that the load beam emerges from the forming tool as straight as it was before welding. Care should be taken so that the force applied by the hammer 72 does not cause compressive stresses in the suspension material.

The working surfaces of the hammer 72 and anvil 74 are made of a material with a higher tensile stress than that of the suspension material of load beam 26 and gimbal 28. Suitable materials for the hammer 72 and anvil 74 include monocarbide, titanium carbide, and others. These materials have a Rockwell A hardness of 85-95, tensile strength of 200-300 kpsi and modulus of elasticity of 80-100 Mpsi.

The working surface of the anvil 74 should be ground flat to less than 0.0005 inches. The working surface of the hammer 72 is flat except for a small circular mesa 78 at the location of each gimbal-to-load beam weld spot 46. The circular mesas 78 could be replaced with hemispheres, conical frustrums, tetrahedrons, or any other useful shape. The diameter of each mesa 78 is substantially equal to the surface diameter of the weld spots 46. The height of each mesa 78 should be between 0.0005 and 0.0050 inches. Each mesa 78 should be of equal height. The "best fit" plane of the collective mesa surfaces should be parallel to the working surface of the anvil 74 within 0.0001 inches.

In a manufacturing environment, the thickness of the suspension material, its composition, and other properties vary unpredictably within predictable limits. This has the undesirable affect of chaotically changing the amount of residual stress created during welding with every change in material lot. Consequently, the amount of force applied by the hammer 72 in the forming tool should be correspondingly adjusted. Statistical process control methods are needed to determine the required compression force and desired adjustments. Residual stress can be accurately inferred from measurements of load beam straightness.

In another preferred embodiment of the present invention, preheating is used to reduce welding induced stresses that result in deformation of the head suspension assembly. Preheating the material in the area of weld spots 46 prior to welding reduces the thermal gradient resulting from poor thermal conductivity of the suspension material and typical laser beam pulse welding methods. The thermal gradient can be reduced if the load beam 26 and gimbal 28 are preheated to a temperature substantially above room temperature, but still below the melting point of the suspension material prior to welding. Preheating benefits can be realized regardless of whether apertures are formed in load beam 26 and gimbal 28. Preheating benefits can also be realized by heating the entire suspension assembly 14, or just the suspension material that surrounds the weld spots 46.

However, the entire suspension assembly 14 need not be preheated. In fact, it is actually impractical to do this. Preheating the entire suspension assembly 14 would require an oven soak of the suspension components as well as the weld clamping fixtures. This would add considerably to the time required to manufacture the suspension and create problems with handling the parts safely. Moreover, the temperature rise that an oven can practically furnish is only a few hundred degrees Fahrenheit, where as the melting point of 300 series stainless steel is approximately 2600° Fahrenheit. Hence, only a slight reduction in the thermal gradient could be realized with oven preheat.

Therefore, the preferred method of preheating is accomplished by dwelling the laser on the weld spots 46 at low power. In order to actually form the welds, a laser power of approximately 10 Kw/cm is applied to the suspension material for approximately two to four milliseconds. By dropping the power by, for example, a factor of ten, and by increasing the time to 20 to 100 milliseconds, load beam 26 and gimbal 28 are heated in a manner that causes some of the heat to beneficially flow radially outward in the suspension material away from the weld spots 46. At the end of the preheat phase, a brief high power laser pulse is sent to the weld spot 46 to weld the load beam 26 to the gimbal 28. This substantially decreases the thermal gradient in the suspension material prior to welding. Thus, the amount of welding induced residual stress developed in the suspension material is substantially reduced.

Figure 10:
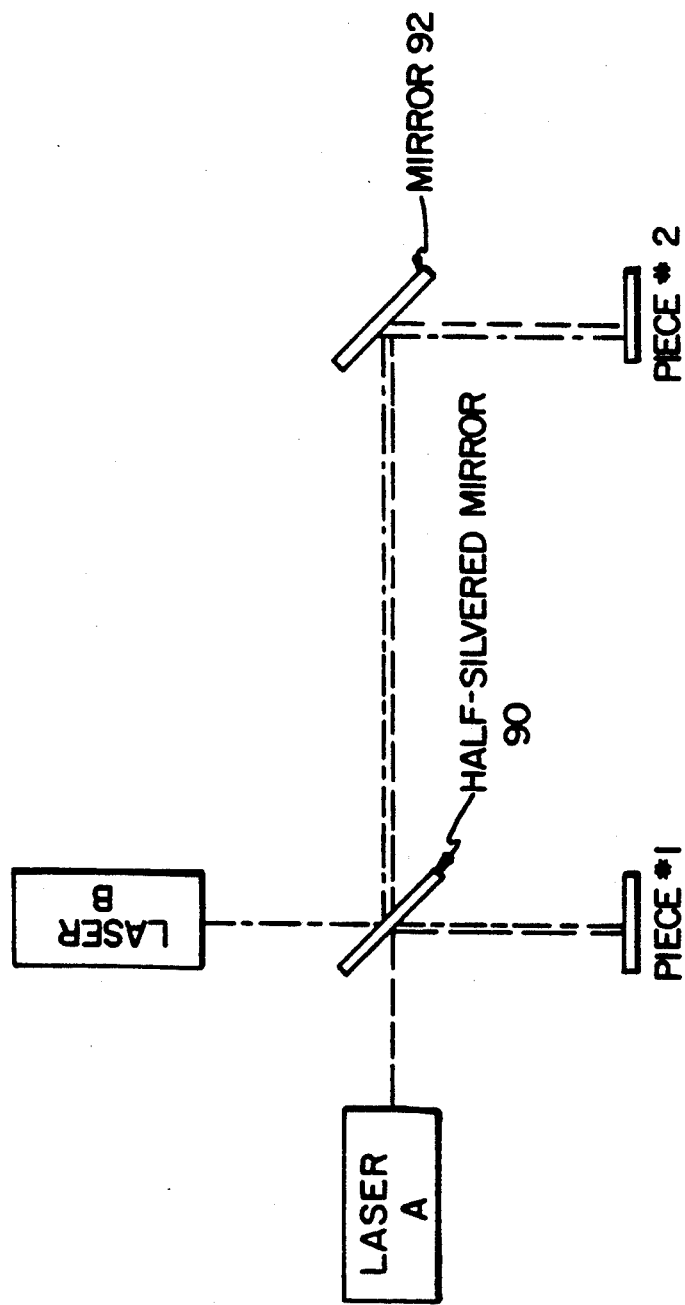
FIG. 10 shows a welding setup for welding in accordance with the present invention.

One preferred method of preheating is to preheat the suspension material and weld with the same laser. However, in other cases, as shown in FIG. 10, it may be advantageous to use two lasers. One laser, laser A, preheats only, and its wavelength, power, and spot diameter are optimized for low temperature heating. The other laser, laser B, welds only, and its operational setup is optimized for high temperature heating.

By using mirrors such as half silvered mirror 90 and mirror 92, efficient welding can be achieved. Also, FIG. 10 shows a setup for welding two workpeices at once.

The laser power versus time curve need not always be a step function but could, for example, be a ramp function. In some cases, it may be necessary to post-heat the weld. This would slow the cooling rate and perhaps reduce the number of microfractures formed within the weld, resulting in a substantially stronger weld.

Although the present invention has been described with reference to preferred embodiments, workers skilled in the art will recognize that changes may be made in form and detail without departing from the spirit and scope of the invention.

What is claimed is:

1. A method of making a suspension assembly in a magnetic disc drive, the suspension assembly including a head, a gimbal for supporting the head, and a load beam for supporting the gimbal, the method comprising:
    forming a load beam aperture extending through the load beam and having a perimeter;
    forming a gimbal aperture extending through the gimbal and having a perimeter;
    placing a surface of the gimbal in contact with a surface of the load beam so that the gimbal aperture is aligned with the load beam aperture to form a pair of aligned apertures, the pair of apertures having a circumferential periphery; and
    welding the gimbal to the load beam by impinging a laser beam on a weld spot positioned proximate the circumferential periphery of the pair of aligned apertures so that the weld spot has a weld aperture extending therethrough to reduce stress induced strains in the material surrounding the weld spot which cause the load beam to deform.

2. The method of claim 1 wherein the gimbal aperture and the load beam aperture have perimeters of different size.

3. The method of claim 1 wherein the step of forming a gimbal aperture comprises:
    forming a plurality of gimbal apertures extending through the gimbal.

4. The method of claim 3 wherein the step of forming a load beam aperture comprises:
    forming a plurality of load beam apertures extending through the load beam.

5. The method of claim 4 wherein the step of placing comprises:
    placing a surface of the gimbal in contact with a surface of the load beam so that the plurality of gimbal apertures are aligned with the plurality of load beam apertures to form a plurality of pairs of aligned apertures, each pair of aligned apertures having a circumferential periphery.

6. The method of claim 5 wherein the step of welding comprises:
    welding the gimbal to the load beam at a plurality of weld spots, each weld spot positioned proximate the circumferential periphery of a pair of aligned apertures so that each weld spot has a weld aperture extending therethrough.

7. A method of making a suspension assembly in a magnetic disc drive, the suspension assembly including a head, a gimbal for supporting the head, and a load beam for supporting the gimbal, the method comprising:
    placing a surface of the gimbal in contact with a surface of the load beam;
    laser beam welding the gimbal to the load beam at a weld spot; and
    forming an aperture extending through at least one of the gimbal or the load beam, the aperture having a circumferential periphery, to reduce residual stresses and associated strains induced in the suspension assembly which cause the load beam to deform by the step of laser beam welding.

8. The method of claim 7 wherein the step of forming an aperture comprises:
    forming at least one gimbal aperture extending through the gimbal and having a perimeter.

9. The method of claim 8 wherein the step of forming an aperture further comprises:
    forming at least one load beam aperture extending through the load beam and having a perimeter.

10. The method of claim 9 wherein the step of placing comprises:
    placing a surface of the gimbal in contact with a surface of the load beam so that each of the gimbal apertures is aligned with each of the load beam apertures to form pairs of aligned apertures, the pairs of aligned apertures each having a circumferential periphery.

11. The method of claim 10 wherein the step of welding comprises:
    impinging a laser beam on a weld spot proximate the circumferential periphery of each of the pairs of aligned apertures.

12. The method of claim 7 wherein the step of performing a stress reducing step comprises:
    preheating a selected area of the surfaces in contact to reduce formation of a thermal gradient in the selected area.

13. The method of claim 12 wherein the step of laser beam welding comprises:
   laser beam welding the surfaces in contact in a substantially central portion of the preheated selected area while the preheated selected area is at an elevated temperature.

14. The method of claim 12 wherein the step of performing a stress relieving step comprises:
   applying a compressive force to the weld spot in a direction substantially perpendicular to the surfaces in contact, the compressive force having a magnitude sufficient to reduce welding induced residual stresses in the gimbal and the load beam.

15. The method of claim 14 wherein the step of applying a compressive force comprises:
   placing the weld spot between a hammer and an anvil; and
   urging the hammer toward the anvil to apply the compressive force to the weld spot.

16. A method of making a suspension assembly in a magnetic disc drive, the suspension assembly including a head, a gimbal for supporting the head, and a load beam for supporting the gimbal, the method comprising:
   placing a surface of the gimbal in contact with a surface of the load beam;
   welding the gimbal to the load beam at a weld spot on the surfaces in contact; and
   applying a compressive force to the weld spot in a direction substantially perpendicular to the contacting surfaces, the compressive force having a magnitude sufficient to reduce welding induced residual stresses in the weld spot and welding induced strains in the material surrounding the weld spot in the gimbal and the load beam which cause the load beam to deform.

17. The method of claim 16 wherein the step of applying a compressive force comprises:
   placing the weld spot between a hammer and an anvil; and
   urging the hammer toward the anvil to apply the compressive force to the weld spot.

18. The method of claim 17 wherein the step of placing the weld spot between a hammer and an anvil comprises:
   placing the weld spot between the anvil and mesas projecting from the hammer.

19. The method of claim 18 wherein the step of urging the hammer toward the anvil comprises:
   urging the hammer toward the anvil so that the mesas projecting from the hammer contact the weld spot and transfer the compressive force to the weld spot.

20. The method of claim 17 wherein the step of welding comprises:
   welding the gimbal to the load beam at a plurality of weld spots on the surfaces in contact.

21. The method of claim 20 wherein the step of placing the weld spot between a hammer and an anvil comprises:
   placing the plurality of weld spots between the anvil and a plurality of mesas projecting from the hammer wherein each mesa is aligned with a weld spot.

22. The method of claim 21 wherein the step of applying a compressive force comprises:
   urging the hammer toward the anvil so the plurality of mesas transfer the compressive force to the weld spots.

23. The method of claim 16 wherein the step of applying a compressive force comprises:
   applying a compressive force having a magnitude in the range of approximately 100 to 1000 pounds.

* * * * *

UNITED STATES PATENT AND TRADEMARK OFFICE
CERTIFICATE OF CORRECTION

PATENT NO. : 5,201,458
DATED : April 13, 1993
INVENTOR(S) : TRACY M. HAGEN It is certified that error appears in the above-identified patent and that said Letters Patent is hereby corrected as shown below:

Col. 11, line 7, delete "claim 12", insert --claim 7--

Signed and Sealed this

Seventh Day of December, 1993

*Attest:*

BRUCE LEHMAN

*Attesting Officer*   *Commissioner of Patents and Trademarks*